United States Patent [19]

Atarashi et al.

[11] Patent Number: 5,387,379
[45] Date of Patent: Feb. 7, 1995

[54] WASHING METHOD FOR WORKPIECE

[75] Inventors: Yasunori Atarashi, Ibaraki; Kojiro Shirahata; Hirofumi Murata, both of Toride, all of Japan

[73] Assignee: Canon Kabushiki Kaisha, Tokyo, Japan

[21] Appl. No.: 913,392

[22] Filed: Jul. 15, 1992

[30] Foreign Application Priority Data

Jul. 16, 1991 [JP] Japan .................. 3-175516
Jul. 16, 1991 [JP] Japan .................. 3-175520

[51] Int. Cl.6 ............................................ B29C 71/00
[52] U.S. Cl. .............................. 264/37; 65/27; 134/10; 264/233; 264/344
[58] Field of Search .............. 264/233, 37, 341, 340, 264/232, 264, 344, 38, 179, 169-170, 343; 134/10, 12; 65/27

[56] References Cited

U.S. PATENT DOCUMENTS

| | | | |
|---|---|---|---|
| 3,558,765 | 1/1971 | Bruner et al. | 264/233 |
| 3,979,220 | 9/1976 | Ishiyama et al. | 134/12 X |
| 4,327,048 | 4/1982 | Nyman et al. | 264/233 |
| 4,379,525 | 4/1983 | Nowicki et al. | 264/37 |
| 4,383,961 | 5/1983 | Nyman et al. | 264/233 |

FOREIGN PATENT DOCUMENTS

| | | | |
|---|---|---|---|
| 282722 | 9/1990 | German Dem. Rep. | 264/233 |
| 56-126146 | 10/1981 | Japan | 264/233 |
| 2062531 | 5/1981 | United Kingdom | 264/233 |

Primary Examiner—Jeffery R. Thurlow
Attorney, Agent, or Firm—Fitzpatrick, Cella, Harper & Scinto

[57] ABSTRACT

A washing method for a workpiece, a resin molded product and a manufacturing method for a resin molded product. There are three steps involved, a detergent washing step, a rinsing step and a drying step. In the detergent washing step there is an additional step in which the detergent water is separated into a condensed liquid and water vapor, the water vapor being discharged into the air. The apparatus used in the method consists of degreasing baths, and withdrawal baths for the detergent wash, a pure water bath for rinsing and a drying bath. The apparatus also has an air heating unit which supplies hot air to form the water vapor in the separation step of the detergent water.

1 Claim, 2 Drawing Sheets

WASHING METHOD FOR WORKPIECE

BACKGROUND OF THE INVENTION

1. Field of the Invention

The present invention relates to a washing method for a workpiece, and washing and manufacturing methods for a resin molded product.

2. Related Background Art

Conventionally, it is a common practice to wash a mold releasing agent adhering to the surface of a resin molded product (for example, a conveying guide for use in a paper discharging portion for a laser beam printer) in a washing step, which are obtained by molding a resin material in a molding step, before the product is coated in a coating step (one of the surface treatment steps), wherein a freon is generally used in the cleaning step because it is harmless, non-inflammable, and inexpensive.

However, since the freon destroys the ozone layer, an international regulation of freon has been carried out since 1989, and there is urgent necessity for the development of the washing method not using the freon. One of the washing methods not using the freon relies on the use of a detergent water.

However, since the washing method using the detergent water requires rinsing for removing the detergent water adhering to the surface of resin molded product after washing, a problem arises in connection with the drainage of a large amount of water used in rinsing.

Said problem also arises in removing unnecessary matters adhering to the surface of a workpiece made of e.g. glass with the detergent water.

SUMMARY OF THE INVENTION

An object of the present invention is to provide a washing method for a workpiece, a washing method for a resin molded product and a manufacturing method for a resin molded product, in which there is no drainage problem of the detergent water.

The washing method for a workpiece according to the present invention comprises:
- a detergent water washing step for washing unnecessary matters adhering to a surface of the workpiece by a detergent water;
- a rinsing step for rinsing said workpiece washed in said detergent water washing step;
- a dewatering step for dewatering said workpiece rinsed in said rinsing step, and
- a drying step for drying said workpiece dewatered in said dewatering step, wherein the water containing detergent produced in said detergent water washing step is separated into a condensed liquid of said detergent and a water vapor, the condensed liquid of said detergent is reused in said detergent washing step, and said water vapor is discharged into the air.

The drain water produced in said rinsing step and said dewatering step can be reused in said detergent water cleaning step.

A washing method for a resin molded product according to the present invention comprises:
- a detergent water washing step for washing a mold releasing agent adhering to the surface of the resin molded product by a detergent water;
- a rinsing step for rinsing said resin molded product washed in said detergent water washing step;
- a dewatering step for dewatering said resin molded product rinsed in said rinsing step, and
- a drying step for drying said resin molded product dewatered in said dewatering step, wherein the water containing detergent produced in said detergent water washing step is separated into a condensed liquid of said detergent and the water vapor, the condensed liquid of said detergent is reused in said detergent washing step, and said water vapor is discharged into the air.

The drain water produced in said rinsing step and said dewatering step can be reused in said detergent water washing step.

A manufacturing method for a resin molded product according to the present invention comprises:
- a molding step for molding a resin material to obtain the resin molded product;
- a washing step for washing said resin molded product obtained in said molding step; and
- a surface treatment step for treating a surface of said resin molded product washed in said washing step, said washing step comprising:
- a detergent water washing step for washing a mold releasing agent adhering to a surface of said resin molded product by a detergent water;
- a rinsing step for rinsing said resin molded product washed in said detergent water washing step;
- a dewatering step for dewatering said resin molded product rinsed in said rinsing step; and
- a drying step for drying said resin molded product dewatered in said dewatering step, wherein the water containing detergent produced in said detergent water washing step is separated into a condensed liquid of said detergent and a water vapor, the condensed liquid of said detergent is reused in said detergent cleaning process, and said water vapor is discharged into the air.

The drain water produced in said rinsing step and said dewatering step can be reused in said detergent water washing step.

In the washing method for a workpiece and the washing method for a resin molded product according to the present invention, the water containing detergent produced in the detergent water washing step is separated into a condensed liquid of the detergent and the water vapor, and the water vapor is discharged into the air, whereby the drainage can be dealt with in the form of water vapor without adversely affecting the environment, and the condensed liquid of detergent can be reused in said detergent water washing step, so that the detergent can be effectively used.

In the manufacturing method for a resin molded product according to the present invention, it is possible to perform the surface treatment after cleaning of the resin molded product by the washing method without using the freon and without problems associated with the drainage.

A further object of the present invention is to provide an apparatus for condensing the detergent water used in said washing step.

In order to accomplish the above object, the apparatus of the present invention is characterized by comprising:
- an air heating unit for heating an air outside of a structural body by taking in the air to forcedly supply the heated air upward and providing downward on the structural body;

a water vapor discharge unit for discharging the water vapor to the outside of said structural body and providing upward on the structural body, and a separation unit provided between said air heating unit and said water vapor discharge unit of said structural body, said separation unit comprising:

detergent water supply means for dispersing a water containing detergent downward which is supplied from said washing apparatus for washing unnecessary matters adhering to a surface of workpiece by a detergent water;

a packing material provided downward the detergent water supply means and for permitting the water containing said detergent supplied from upward to contact with said heated air supplied from downward in a large surface area, thereby separating the water containing said detergent into said water vapor and a condensed liquid of the detergent; and a condensed liquid supply unit for returning the condensed liquid of said detergent to said washing apparatus and provided through a partition member having a number of openings downward said packing material and communicating with said air heating unit.

Also, the water vapor discharge unit may comprise a water droplets removal filter for removing water droplets and a mist removal filter for removing the mist so as to remove liquid components from the water vapor separated from the separation unit.

Further, the detergent may have a property of removing a mold release agent for resin molding, and the washing ability does not change with the dilution or condensation.

The water containing detergent supplied from the washing apparatus is dispersedly supplied from upward of the packing material by the cleaning water supply means, and flows down along the surface of the packing materials. On the other hand, the external air is supplied upward forcedly after being heated in the air heating chamber, and passes through the condensed liquid supply unit to the packing materials. Since the water containing detergent and the heated air are contacted in a large surface area when the water containing the detergent flows down along the surface of the packing materials, the water containing the detergent is separated into the water vapor and the condensed liquid, as a result of the water content being evaporated.

And, the condensed liquid drops down into the condensed liquid supply unit and is returned to the washing apparatus, while the water vapor flows into the water vapor discharge unit and is discharged from the water vapor discharge unit outwards.

Also, the water vapor in which liquid components are removed by providing the water droplets removal filter and the mist removal filter in the water vapor discharge unit, is discharged outwards.

DESCRIPTION OF THE PREFERRED EMBODIMENTS

The preferred embodiments of the present invention will be described below with reference to the drawings.

Figure 1:
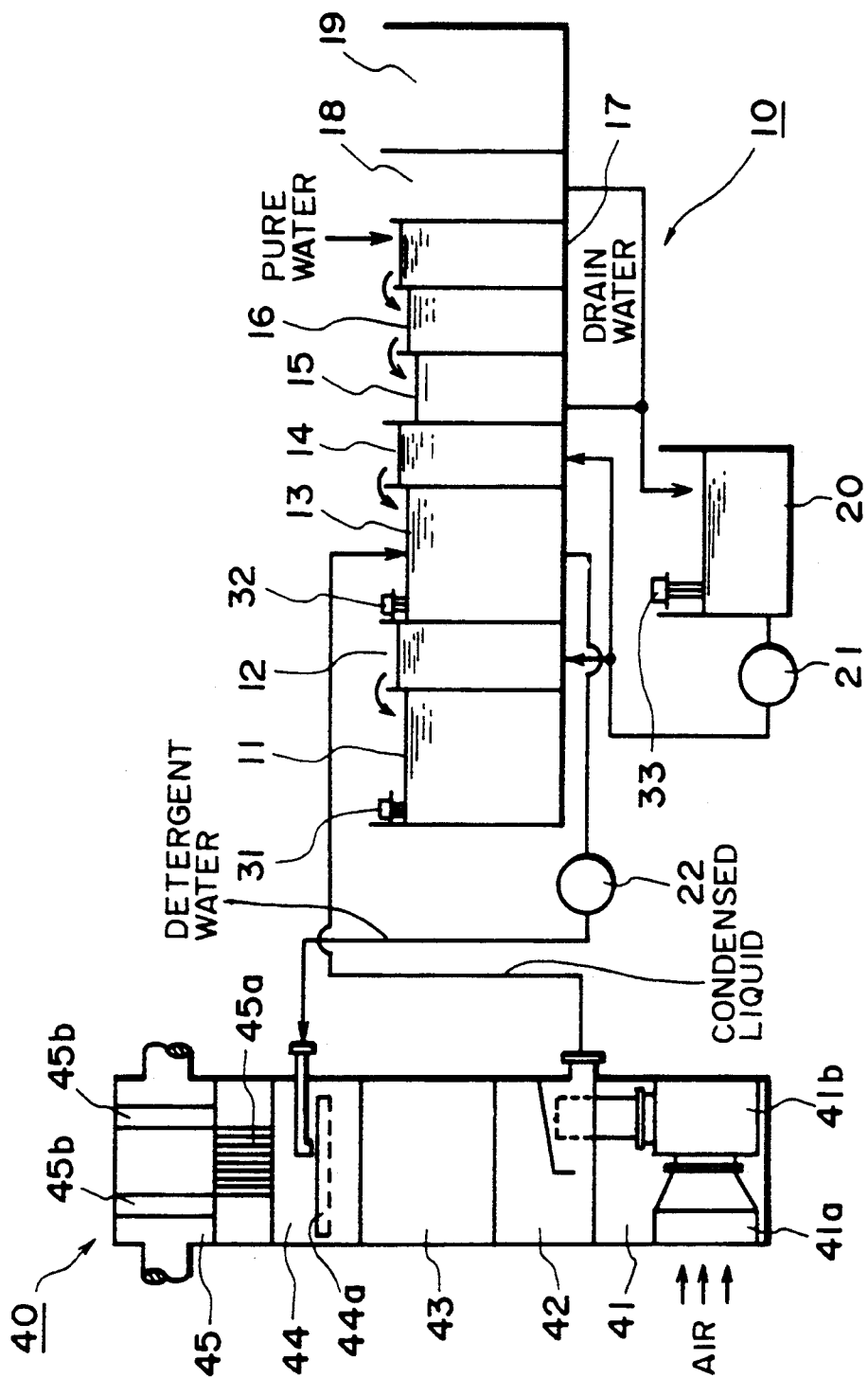
FIG. 1 is a schematic constitutional view illustrating a cleaning apparatus without freon for the explanation of one embodiment of a cleaning method for a resin molding according to the present invention.

FIG. 1 is a schematic constitutional view illustrating a washing apparatus without freon for the explanation of one embodiment of a washing method for a resin molded product according to the present invention.

The washing apparatus without Freon comprises a washing apparatus 10 and a condenser 40.

The washing apparatus 10 comprises the following components.

(1) First degreasing bath 11, first withdrawal bath 12, second degreasing bath 13 and second withdrawal bath 14.

These baths are provided to perform the detergent water washing step for washing a mold releasing agent adhering to the surface of a resin molded product with a detergent water. The first degreasing bath 11 is filled with the detergent water (having a temperature of about 55° C.) containing a detergent to first wash the mold releasing agent adhering to the surface of the resin molded product. The first withdrawal bath 12 withdraws the detergent adhering to the surface of resin molded product washed cleaned in the first degreasing bath 11 by rinsing. The second degreasing bath 13 is filled with the detergent water (having a temperature of about 55° C.) containing detergent to again wash the mold releasing agent remaining on the surface of resin molded product rinsed in the first withdrawal bath 12. The second withdrawal bath 14 withdraws the detergent adhering to the surface of resin molded product cleaned in the second degreasing bath 13 by rinsing.

(2) First rinsing bath 15, second rinsing bath 16 and pure water bath 17

These baths are provided to perform the rinsing step for rinsing the resin molded product cleaned in the detergent water washing step to rinse out the detergent remaining on the surface of resin molded product rinsed in the second withdrawal bath 14.

(3) Dewatering bath 18

The dewatering bath 18 is provided to perform the dewatering step for dewatering the resin molded product rinsed in the rinsing step to remove the pure water adhering to the surface of resin molding rinsed in a pure water bath 17.

(4) Drying bath 19

The drying bath 19 is provided to perform the drying step for drying the resin molded product dewatered in the dewatering step to dry the resin molded product in which pure water has been removed in the dewatering bath 18.

(5) Tank 20 and first pump 21

The tank 20 and the first pump 21 are provided to reuse the drain water produced in the rinsing step and the dewatering step, in the detergent water cleaning process. The tank 20 serves to temporarily store the drain water from the first rinsing bath 15 and the dewatering bath 18. The first pump 21 serves to supply the drain water within the tank 20 to the first withdrawal bath 12 and the second withdrawal bath 14.

(6) Second pump 22

The second pump 22 serves to supply the water containing detergent (thereinafter referred to as "detergent water") from the second degreasing bath 13 to a detergent water supply chamber 44 of the condenser 40 as will be described later.

The condenser 40 is to separate the water containing detergent (detergent water) produced in the detergent water cleaning step into a condensed liquid of the detergent and the water vapor, wherein the condensed liquid of detergent is reused in the detergent water cleaning step and the water vapor is discharged into the air. The condenser 40 comprises the following components.

(1) Air heating chamber 41

The air heating chamber 41 has a heater 41a and a fan 41b. The air (having a temperature of 25° C. and a humidity of 60%) is taken in and heated up to a temperature of about 60° C. by the heater 41a, and then the heated air is blown up by the fan 41b, as shown.

(2) Condensed liquid supply chamber 42

The condensed liquid supply chamber 42 supplies the heated air blown up by the fan 41b to a separation chamber 43 provided upward as shown and as described thereinafter, and returns the condensed liquid of detergent separated in the separation chamber 43 to the second degreasing bath 13 of the washing apparatus 10.

(3) Separation chamber 43

A separation chamber 43 is filled with flower-shaped packing material (e.g., M-type Terralet manufactured by Nittetu Kakouki Co. Ltd.,). The detergent water supplied from the detergent water supply chamber 44 as will be described later is permitted to contact with the heated air to evaporate the water content therein by the heated air, whereby the detergent water is separated into a condensed liquid of the detergent and the water vapor. The detergent needs a property of not deteriorating even if it is condensed, for example P$_3$grato20 (manufactured by Henkel) as the detergent for the mold releasing agent for resin molded product may be used.

(4) Detergent water supply chamber 44

The detergent water supply chamber 44 has a shower tube 44a. The detergent water fed from the second degreasing bath 13 by the second pump 22 is evenly dispersed by the shower tube 44a to be supplied to the separation chamber 43 downwardly provided as shown.

(5) Water vapor discharge chamber 45

The water vapor discharge chamber 45 has a water droplets filter 45a and a mist removal filter 45b. The water droplets and the mist contained in the water vapor separated in the separation chamber 43 and passing through the detergent water supply chamber 44 are removed by the water droplets removal filter 45a and the mist removal filter 45b, respectively, and then the water vapor is discharged through an exhaust port (not shown) into the air. The water droplets removal filter 45a may be Sanroid Eliminator (Trademark, Tsutsunaka Plastic Industry Co., Ltd.), for example, and the mist removal filter 45b may be Saran Lock (Trademark, manufactured by Asahi Dow Co. Ltd.,), for example.

Next, the drainage step by the condenser 40 in this embodiment will be described below.

The detergent drain water fed from the second degreasing bath 13 of the washing apparatus 10 is dispersed by the shower tube 44a and supplied into the separation chamber 43.

On the other hand, the air (having a temperature of 25° C. and a humidity of 60%) outside the condenser 40 is heated up to a temperature of about 60° C. by the heater 41a, and the heated air is forcedly fed to the condensed liquid supply chamber 42 by the fan 41a and further to the separation chamber 43. Since the separation chamber 43 is filled with packing materials (not shown) such as "M-type Terralet" as previously described, the detergent water flows down along the surface of the packing material, so that the detergent water makes contact with the heated air in a large surface area. The heated air passes across the surface of the packing material along which the detergent water flows down, whereby the detergent water obtains the heat of evaporization from the heated air, so that its water content is evaporated. Thus, the detergent water is separated into a condensed liquid of the detergent and the water vapor. The condensed liquid separated from the detergent water passes through small holes (not shown) of the partition plate, and drops the condensed liquid supply chamber 41, then, is returned to the second degreasing bath 13 of the washing apparatus 10. The water vapor separated from the detergent water passes through the detergent water supply chamber 44 to the water vapor discharge chamber 45, and discharged through the exhaust port of the water vapor discharge chamber 45 into the air. The water droplets and the mist contained in the water vapor are removed by the water droplets removal filter 45a and the mist removal filter 45b, respectively, and become water vapor having a temperature of 40° C. and a humidity of 100%, which are discharged into the air.

Note that in the washing apparatus without Freon, the pure water is supplied from the outside to the pure water bath 17, then from the pure water bath 17 to the second rinsing bath 16, and further from the second rinsing bath 16 to the-first rinsing bath 15. The first degreasing bath 11 is supplied with the pure water containing a small amount of detergent from the first withdrawal bath 12, and the second degreasing bath 13 is supplied with the pure water containing a small amount of detergent from the second withdrawal bath. 14, whereby the shortage of detergent in the first and second degreasing baths 11, 13 can be prevented even if the washing is repeated a number of times. Further, the first degreasing bath 11, the second degreasing bath 13 and the tank 20 have first to third liquid level sensors 31 to 33 mounted thereon, respectively, to prevent the overflow of the detergent water.

Said washing apparatus without Freon, thus constituted in the above-described way, has no problems with the drainage of a large amount of water for use in rinsing because the drain water from the first rinsing bath 15 and the dewatering bath 18 is once stored in the tank 20, and then supplied to the first and second withdrawal baths 12, 14, and the detergent water from the second degreasing bath 14 is separated into a condensed liquid of the detergent and the water vapor in the condenser 40, so that harmless water vapor is discharged into the air.

While washing the mold releasing agent for resin molded product using the detergent water has been described in the above description, the freonless washing apparatus as shown in FIG. 1 is also applicable to cleaning the oil and contamination adhering to the surface of a workpiece made of e.g. glass.

Next, one embodiment for a manufacturing method of resin molded product according to the present invention will be described below.

The manufacturing method of resin molded product in this embodiment is the same as the conventional manufacturing method for resin molded product, in a point of comprising a molding step for molding a resin material to obtain a resin molded product, a washing step for washing the resin molded product obtained in the molding step, and a surface treatment step for treating the surface of the resin molded product cleaned in the washing process, but the washing step is different from that of the conventional method of resin molded product, in a point that a detergent water washing step for washing the mold releasing agent for resin molded product with the detergent water, a rinsing step for rinsing the resin molded product cleaned in the detergent water washing step, a dewatering step for dewatering the resin molded product rinsed in the rinsing step, and a drying step for drying the resin molded product dewatered in the dewatering step are provided, wherein the water containing detergent produced in the detergent water washing step is separated into a condensed liquid of detergent and the water vapor, the condensed liquid of the detergent being reused in the detergent water washing step, and the water vapor being discharged into the air.

Figure 2:
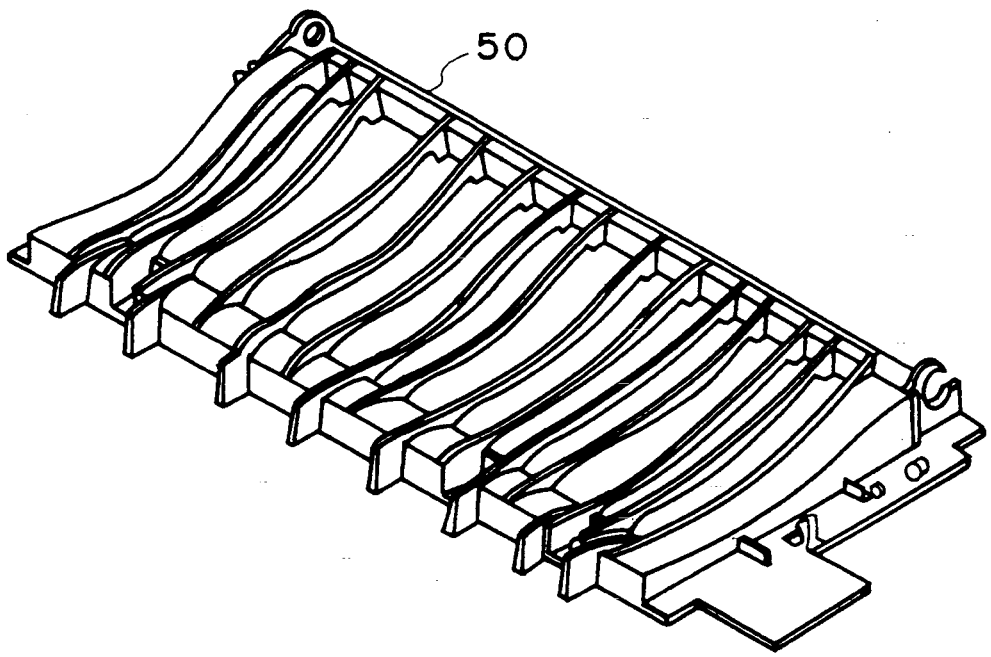
FIG. 2 is a perspective view of a conveying guide showing one example of a resin molding fabricated with a fabrication method of resin molding according to the present invention.

That is, the operation of each step in said manufacturing method for manufacturing, for example, a conveying guide 50 as shown in FIG. 2 for use in a paper exhaust portion of a laser beam printer LBP-B406 made by Canon K.K., is performed as follows:

(1) Molding step

With a known resin molding apparatus and using ABS (Acryl Butyl Styrene) which is one of resin materials, a conveying guide 50 which is one of the resin molded product is formed. The conveying guide 50 taken out from the resin molding apparatus has a mold releasing agent adhering to the surface thereof.

(2) Washing step

In order to wash the mold releasing agent adhering to the surface of the conveying guide 50, the conveying guide 50 is cleaned by the freonless washing apparatus without Freon as shown in FIG. 1.

First, the conveying guide 50 is immersed and washed in the first degreasing bath 11 filled with the detergent water (having a temperature of about 55° C.) containing the detergent (P3grato20 made by Henkel, with a concentration of 4%), and then immersed and rinsed in the first withdrawal bath 12. Thereafter, the conveying guide 50 is immersed and washed again in the second degreasing bath 13 filled with the detergent water (having a temperature of about 55° C.) containing the detergent (P3grato20 made by Henkel, with a concentration of 2%), and then immersed and rinsed in the second withdrawal bath 14 (detergent water washing step). Subsequently, the conveying guide 50 is immersed and rinsed in the first rinsing bath 15, the second-rinsing bath 16, and the pure water bath 17, in succession, (rinsing step), dewatered in the dewatering bath 18 (dewatering step), and then dried in the drying bath 19 (drying step). Then, the water containing detergent (or detergent water) produced in the detergent water washing step is separated into a condensed liquid of the detergent and the water vapor by the condenser 40, the condensed liquid of the detergent being reused in the detergent water washing step and the water vapor being discharged into the air.

(3) Surface treatment step (coating step)

The conveying guide 50 having the mold releasing agent removed in the washing step is fed to a coating process to have the surface thereof UV coated by a known coating apparatus.

Accordingly, the manufacturing method of resin molded product has no drainage problems because a large amount of drain water produced in the cleaning process is converted into the water vapor and discharged into the air.

Figure 3:
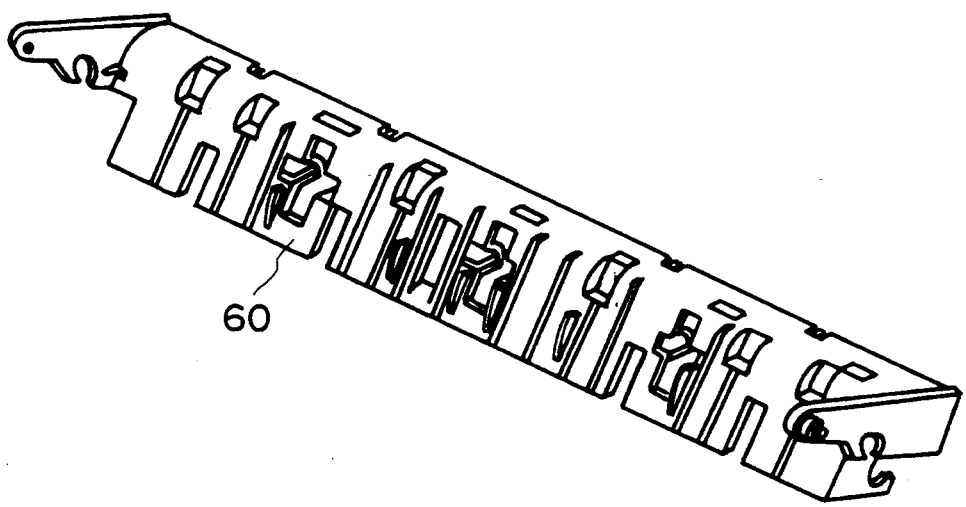
FIG. 3 is a perspective view of a separation claw showing another example of a resin molding fabricated with a fabrication method of resin molding according to the present invention.

Note that the resin molded product to be cleaned is not limited to the conveying guide 50 as shown in FIG. 2, but may be a separation claw 60 made of PPS (polyphenylene sulfide) as shown in FIG. 3 for use in the paper exhaust portion of a laser beam printer LBP-B406 manufactured by Canon, K.K., as well as a conveying guide, a paper feed/exhaust guide, an outer package board, a separation claw and an operation button made of resin material for use in a copying machine, a printer and a facsimile apparatus, and a plastic lens.

Also, the material for a resin molded product may be PC (polycarbonate), acrylic resin, fluororesin, PUR (polyurethane), PP (polypropylene), PE (polyethylene), PVC (vinylchloride), EP (epoxy resin), or PA (polyamide), in addition to ABS (acryl butyl stylene) and PPS (polyphenylene sulfide) as previously mentioned.

Further, the surface treatment step in the manufacturing method of resin molded product may be, a coating process for the antireflection film of plastic lens, in addition to the coating step as previously mentioned.

The detergent for the mold releasing agent of resin molded product may be, LT5600 5, Siliron41, EP-680, Saxin, Upon and P3-T180 which belong to P3 series made by Henkel in addition to the P3grato20 (manufactured by Henkel) as previously described.

As described above, the present invention has the following advantages.

The washing method for a workpiece and the washing method for a resin molded product according to the present invention has no problems with the drainage caused by the use of detergent, because the water containing detergent produced in the detergent washing step is separated into a condensed liquid of detergent and the water vapor which is then discharged into the air, whereby the drain water can be dealt with in the form of the water vapor without adversely affecting the environment.

Also, the manufacturing method of a resin molded product according to the present invention has no problems with the drainage caused by the use of detergent in the washing step, as the resin molded product is cleaned by the washing method according to the present invention.

The water containing detergent is separated into a condensed liquid of the detergent and the water vapor by contacting the water containing detergent supplied from the washing apparatus with the air heated in the air heating chamber in a large area by the use of the packing material. And, the condensed liquid is returned to the washing apparatus, and the water vapor is discharged into the air, whereby the drainage can be dealt with in the form of the water vapor without disposing of the water containing the detergent, thereby no adversely affecting the environment. The condensed liquid of detergent is returned to the washing apparatus and reused, so that the effective use of the detergent can be made.

Further, the water droplets removal filter and the mist removal filter are provided in the water vapor discharge portion, whereby the water vapor can be discharged into the air after the complete removal of liquid constituents contained in the water vapor.

What is claimed is:

1. A method for washing a workpiece, said method comprising the steps of:

washing unnecessary matters adhering to the workpiece by a detergent water which is stored in a washing bath;

rinsing the workpiece washed in the washing step, by a water which is stored in a rinsing bath;

supplying the used rinse water to the detergent water used in the washing step;

supplying a pure water to the washing bath and the rinsing bath;

dewatering the workpiece which has been washed in the washing bath and rinsed in the rinsing bath;

drying the workpiece dewatered in the dewatering step; and separating the detergent water used in the washing step into a condensed liquid of a detergent and water vapor, said separating comprising the steps of:

(i) heating outside air up to a predetermined temperature;

(ii) contacting the heated air with the detergent water used in the washing step to evaporate water contained therein thereby separating the detergent water into the condensed liquid of the detergent and the water vapor;

(iii) discharging the water vapor to the atmosphere; and (iv) returning the condensed liquid of the detergent to the washing bath.

* * * * *

UNITED STATES PATENT AND TRADEMARK OFFICE
CERTIFICATE OF CORRECTION

PATENT NO. : 5,387,379
DATED : February 7, 1995
INVENTOR(S) : YASUNORI ATARASHI, ET AL.

It is certified that error appears in the above-identified patent and that said Letters Patent is hereby corrected as shown below:

ON TITLE PAGE

In [56] References Cited:

Under U.S. PATENT DOCUMENTS, insert:
--2,709,143   5/1955   Francis et al. ....... 134/13--.
Under FOREIGN PATENT DOCUMENTS, insert:
--2251403   7/1992   United Kingdom ........ B29C/71/00
  2081860   2/1982   United Kingdom ........ B01D/12/00--.

COLUMN 1

Line 17, "a freon" should read --a Freon--.
Line 20, "the freon" should read --Freon--.
Line 21, "freon" should read --Freon--.
Line 23, "the freon." should read --Freon.--.
Line 24, "the freon" should read --Freon--.
Line 32, "matters" should read --matter--.
Line 45, "matters" should read --matter--.

COLUMN 2

Line 57, "the freon" should read --Freon--.
Line 67, "providing" should read --provided--.

COLUMN 3

Line 3, "providing" should read --provided--.
Line 62, "freon" should read --Freon--.

UNITED STATES PATENT AND TRADEMARK OFFICE
CERTIFICATE OF CORRECTION

PATENT NO. : 5,387,379
DATED : February 7, 1995
INVENTOR(S) : YASUNORI ATARASHI, ET AL.

Page 2 of 3

It is certified that error appears in the above-identified patent and that said Letters Patent is hereby corrected as shown below:

COLUMN 4

Line 11, "freon" should read --Freon--.
   Line 20, "14." should read --14--.

COLUMN 6

Line 16, "drops" should read --drops into--.
   Line 33, "the-first" should read --the first--.
   Line 38, "bath." should read --bath--.
   Line 50, "once" should be deleted.
   Line 59, "freonless" should be deleted.
   Line 60, "apparatus" should read --apparatus without Freon--.

COLUMN 7

Line 37, "freonless" should be deleted.
   Line 42, "($P_3$grato20 made)" should read --$P_3$grato20 (made--.
   Line 48, "($P_3$grato20 made)" should read --$P_3$grato20 (made--.

COLUMN 8

Line 20, "stylene)" should read --styrene)--.
   Line 59, "no" should read --not--.

UNITED STATES PATENT AND TRADEMARK OFFICE
CERTIFICATE OF CORRECTION

PATENT NO. : 5,387,379
DATED : February 7, 1995
INVENTOR(S) : YASUNORI ATARASHI, ET AL.

It is certified that error appears in the above-identified patent and that said Letters Patent is hereby corrected as shown below:

COLUMN 9

Line 4, "matters" should read --matter--.

Signed and Sealed this

Thirteenth Day of June, 1995

Attest:

Attesting Officer

BRUCE LEHMAN
Commissioner of Patents and Trademarks